United States Patent [19]

Skoultchi

[11] 3,957,561
[45] May 18, 1976

[54] ANAEROBIC ADHESIVE AND SEALANT COMPOSITIONS EMPLOYING A TWO COMPONENT CATALYST SYSTEM OF DIAZOSULFONE AND O-SULFOBENZIMIDE

[75] Inventor: Martin M. Skoultchi, Somerset, N.J.

[73] Assignee: National Starch and Chemical Corporation, Bridgewater, N.J.

[22] Filed: May 22, 1975

[21] Appl. No.: 579,781

[52] U.S. Cl. ............................... 156/331; 156/310; 156/332; 260/31.8 R; 260/42.17; 260/42.21; 260/42.52; 260/47 UA; 260/63 UY; 260/77.5 AP; 260/86.1 R; 260/86.1 E; 260/86.1 N; 260/86.7; 260/88.3 A; 260/88.7 A; 260/88.7 D; 260/88.7 B; 260/89.5 R; 260/89.5 A; 260/89.5 N; 526/204; 526/225; 526/220; 526/279; 526/298; 526/292; 526/311; 526/320

[51] Int. Cl.² ...................... C09J 5/00; B32B 7/00; B32B 7/10; C08F 3/64

[58] Field of Search ........... 156/310, 327, 331, 332; 260/89.5 R, 89.5 A, 89.5 N, 89.7 R, 89.7 S, 88.7 A, 88.7 B, 88.7 D, 88.3 A, 80.3 R, 80.3 N, 80.3 E, 85.5 A, 85.5 ES, 80.81, 80.72, 80.73, 80.75, 85.5 D, 86.1 R, 86.1 N, 86.1 E, 86.7, 80.76, 78.5 BB, 78.4 N, 78.5 UA, 78.4 N, 77.5 AP, 47 UA, 63 UY

[56] References Cited
UNITED STATES PATENTS

| | | | |
|---|---|---|---|
| 3,435,012 | 3/1969 | Nordlander | 156/332 |
| 3,591,438 | 7/1971 | Joback et al. | 156/310 |
| 3,616,040 | 10/1971 | Toback | 156/331 |
| 3,658,624 | 4/1972 | Lees | 156/332 |
| 3,775,385 | 11/1973 | Ozono et al. | 260/89.5 A |
| 3,837,963 | 9/1974 | Fravenglas et al. | 260/89.5 R |
| 3,853,827 | 12/1974 | Klatil et al. | 260/86.1 E |
| 3,855,040 | 12/1974 | Malofsky | 260/89.5 A |
| 3,880,956 | 4/1975 | Skoultchi | 260/89.5 R |

Primary Examiner—Joseph L. Schofer
Assistant Examiner—Herbert J. Lilling
Attorney, Agent, or Firm—Edwin M. Szala; Ellen T. Dec

[57] ABSTRACT

Anaerobic curing compositions useful as anaerobic adhesives and sealants are described. These compositions comprise mixtures of polymerizable acrylic and substituted acrylic monomers together with a two-component catalytic system comprising a diazosulfone compound used in conjunction with ortho-sulfobenzimide.

8 Claims, No Drawings

ANAEROBIC ADHESIVE AND SEALANT COMPOSITIONS EMPLOYING A TWO COMPONENT CATALYST SYSTEM OF DIAZOSULFONE AND O-SULFOBENZIMIDE

BACKGROUND OF THE INVENTION

I. Field of the Invention

This invention relates to anaerobic curing compositions utilizing polymerizable acrylic and substituted acrylic monomers together with a two component diazosulfone and ortho-sulfobenzimide catalytic system to effect latent polymerization of the acrylic monomers. The compositions are stable for periods of time extending to a half-year or more in the presence of air or oxygen, but cure rapidly in the absence of air or oxygen and in the presence of certain metals thereby finding use as anaerobic adhesives and as sealants.

II. Brief Description of the Prior Art

Anaerobic curing compositions are known and well described in the prior art. U.S. Pat. No. 2,628,178 issued Feb. 10, 1953 describes the preparation of anaerobic curing compositions which rely on the oxygenation of certain monomers until at least 0.1% of active oxygen is introduced into the monomer. The oxygenated monomer remains stable until polymerization is initiated by the absence of air. Another patent, U.S. Pat. No. 2,895,950 issued July 21, 1959, describes compositions containing defined polymerizable polyacrylate ester monomers together with hydroperoxide catalysts. Later patents dealing with anaerobic curing sealants disclose the use of stabilizers, accelerators, etc. in conjunction with peroxide, hydroperoxides or perester catalysts. Recently, U.S. Pat. No. 3,775,385 as well as U.S. Pat. No. 3,880,956 assigned to the assignee of the present application, have disclosed alternate catalysts which do not require the presence of the peroxidic class of compounds.

SUMMARY OF THE INVENTION

I have now found that anaerobic curing compositions characterized in possessing an extended shelf life of a half-year or more in the presence of air or oxygen together with the ability to polymerize or set-up rapidly when excluded from air or oxygen and in contact with or in the presence of certain metals can be formed from a mixture of a polymerizable acrylic or substituted acrylic monomer together with a novel two-component catalytic system. The catalytic system useful herein comprises a mixture of from 0.05–4.0 parts of a diazosulfone compound and from 0.05–4.0 parts of ortho-sulfobenzimide, the parts herein based on 100 parts by weight of the polymerizable monomer. These compositions are particularly useful in the anaerobic bonding of adjacent or closely facing surfaces at least one of which is metal, for example, the mating threads of a nut and bolt.

DESCRIPTION OF PREFERRED EMBODIMENTS

One class of polymerizable monomers useful in the present compositions correspond to the general formula:

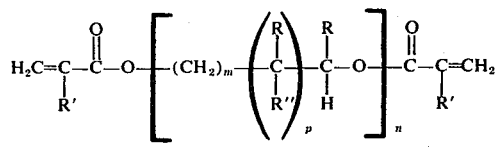

wherein
R is selected from the group consisting of hydrogen, methyl, ethyl,

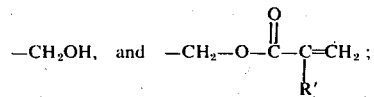

R' is selected from the group consisting of hydrogen, chlorine, methyl and ethyl;
R'' is selected from the group consisting of hydrogen, hydroxy, and

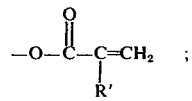

$m$ is an integer equal to at least 1, e.g. from 1 to 8 or higher and preferably from 1 to 4 inclusive;
$n$ is an integer equal to at least 1, e.g., from 1 to 20 or more; and
$p$ is one of the following: 0 or 1.

Monomers useful in this invention and which come within the above general formula include, for example, ethylene glycol dimethacrylate, ethylene glycol diacrylate, polyethylene glycol diacrylate, tetraethylene glycol dimethacrylate, diglycerol diacrylate, diethylene glycol dimethacrylate, pentaerythritol triacrylate, and other polyether diacrylates and dimethacrylates.

The above class of monomers is in essence described in U.S. Pat. No. 3,043,820 issued July 10, 1962 (to R. H. Krieble).

A second class of polymerizable monomers useful in the present compositions correspond to the general formula:

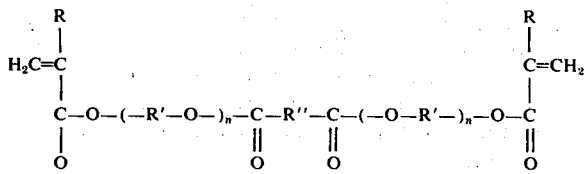

where
R represents hydrogen, chlorine, methyl or ethyl,
R' represents alkylene with 2–6 carbon atoms,
R'' represents $(CH_2)_m$ in which $m$ is an integer of from 0 to 8,

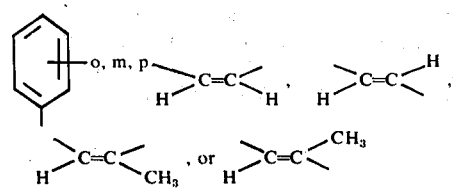

$n$ represents an integer of from 1 to 4.

Typical monomers of this class include, for example, dimethacrylate of bis(ethylene glycol) adipate, dimethacrylate of bis(ethylene glycol) maleate, dimethacrylate of bis(diethylene glycol) phthalate, dimethacrylate of bis(tetraethylene glycol) phthalate, dimethacrylate of bis(tetraethylene glycol) malonate, dimethacrylate of bis(tetraethylene glycol) sebacate, diemethacrylate of bis(ethylene glycol) phthalate, dimethacrylates of bis(tetraethylene glycol) maleate, and the diacrylates and α-chloroacrylates corresponding to said dimethacrylates, and the like.

The above class of monomers is in essence described in U.S. Pat. No. 3,457,212 issued July 22, 1969 (Sumitomo Chemical Company, Ltd.).

Also useful herein are monomers which are isocyanate-hydroxyacrylate or isocyanate-aminoacrylate reaction products which may be characterized as acrylate terminated polyurethanes and polyureides or polyureas. These monomers correspond to the general formula:

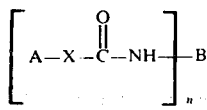

wherein
X is selected from the group consisting of —O— and

and
R is a member selected from the group consisting of hydrogen and lower alkyl of 1 to 7 carbon atoms;
A represents the organic residue of an active hydrogen containing acrylic ester wherein the active hydrogen has been removed, the ester being hydroxy or amino substituted on the alkyl portion thereof and the methyl, ethyl and chlorine homologs thereof;
n is an integer from 1 to 6 inclusive; and
B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted.

Typical monomers of this class include the reaction product of mono- or polyisocyanate, for example, toluene diisocyanate, with an acrylate ester containing a hydroxy or amino group in the non-acrylate portion thereof, for example, hydroxyethyl methacrylate.

The above class of monomers is in essence described in U.S. Pat. No. 3,425,988 issued Feb. 4, 1969 (Loctite Corporation).

Another class of monomers useful in the present application are the mono- and polyacrylate and methacrylate esters of bisphenol type compounds. These monomers may be described by the formula:

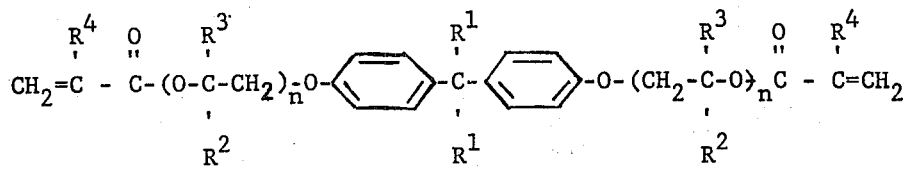

where
$R^1$ is methyl, ethyl, carboxyl or hydrogen;
$R^2$ is hydrogen, methyl or ethyl;
$R^3$ is hydrogen, methyl or hydroxyl;
$R^4$ is hydrogen, chlorine, methyl or ethyl and
n is an integer having a value of 0 to 8.

Representative monomers of the above-described class include: dimethacrylate and diacrylate esters of 4,4'-bishydroxyethoxy-bisphenol A; dimethacrylate and diacrylate esters of bisphenol A; etc. These monomers are essentially described in Japanese Patent Publication No. 70-15640 to Toho Chemical Manuf. Ltd.

In addition to the monomers already described, other useful monomers are monofunctional acrylate and methacrylate esters and the hydroxy, amide, cyano, chloro, and silane substituted derivatives thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acrylate, n-octyl acrylate, 2-ethylhexyl acrylate, decylmethacrylate, dodecyl methacrylate, cyclohexyl methacrylate, tert.-butyl methacrylate, acrylamide, N-methylolacrylamide, diacetone acrylamide, N-tert.-butyl acrylamide, N-tert.-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

The monomers useful herein are seen to be polymerizable monomers having one or more acrylic or substituted acrylic groups as a common, unifying characteristic, and for convenience may be generically termed acrylic and substituted acrylic monomers.

It is understood that the various monomers useful herein are not required to be in a highly purified state. The monomers may be comprised of commercial grades in which inhibitors, stabilizers, or other additives or impurities may be present, as well as those prepared in the laboratory or in pilot plant scale.

The diazosulfones correspond to the general formula:

where
Ar and Ar' are, independently, aryl radicals, preferably phenyl or naphthyl, and
X and Y are, independently, hydrogen, alkyl ($C_1$–$C_4$), chlorine, fluorine, bromine, hydroxy, alkoxy ($C_1$–$C_4$), aryloxy ($C_6$ to $C_{10}$), alkyl ($C_1$–$C_4$) substituted aryl ($C_6$–$C_{10}$), carboxyalkyl ($C_1$–$C_4$), nitro, dialkylamino ($C_1$–$C_4$), etc.

These diazosulfones may be prepared by the reaction of aryl diazonium salts with salts of aromatic sulfinic acids, using any of the methods well known to those skilled in the art. For illustrative purposes, typical diazonium salts which may be used in the preparation of the diazosulfones include, for example, bis(2-methyl-4-chlorobenzenediazonium)naphthalenedisulfonate, bis(2-methoxy-4nitrobenzenediazonium)naphthalenedisulfonate, bis[4-(N,N-diethylamine)-2-methoxybenzenediazonium]tetrafluoroborate, bis(3-nitro-4-chlorobenzenediazonium)tetrachlorozincate, bis(4-nitro-benzenediazonium)sulfate, 1,4-tetramethylene bis(4,4'-diazo)benzoate zinc chloride complex and bis[4-(N-phenylamino)benzenediazonium]sulfate.

Suitable aromatic sulfinic acid salts useful in producing the diazosulfones include the alkali or alkaline earth salts of benzene sulfinic acid and toluene sulfinic acid.

The ortho-sulfobenzimide, also known as saccharin, used in conjunction with the diazosulfones in the present compositions may be represented by the formula:

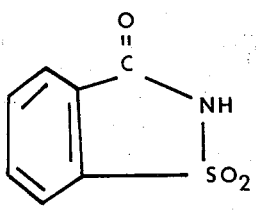

This material may be used in its free form or may be employed in the form of the corresponding sodium salt.

One of the unique aspects of the catalyst system of the present invention is that when the diazosulfone component alone is formulated with an acrylic monomer and the mixture is placed between metal surfaces in the absence of air or oxygen, the system remains inactive and only in combination with the ortho-sulfobenzimide does polymerization and satisfactory curing occur.

The relative amounts of the diazosulfone and orthosulfobenzimide catalytic components used in the compositions of the present invention should be sufficient to initiate polymerization of the monomer when the composition is in contact with or closely adjacent to a selected metal, later described, and in the absence of oxygen. Such effective amounts of catalytic components will vary mainly depending on the monomer component of the composition, the structural variation in the diazosulfone and also depending on the metal with which it is to used. For most applications, however the amount of the diazosulfone employed will range from about 0.05 to 4.0% by weight, preferably from 0.1 to 2%, based on the weight of the monomer. The ortho-sulfobenzimide will also be present within the range of about 0.05 to 4%, preferably 0.1 to 2% by weight of the monomer. A particularly preferred anaerobic sealant of the present invention contains the diazosulfone in an amount of 0.25% and the ortho-sulfobenzimide in an amount of 0.30%. It can be understood that mixtures of different diazosulfones may also be employed together with the ortho-sulfobenzimide as described herein.

One of the advantages of the unique catalytic system employed herein is that the components thereof are much more soluble in the monomeric systems than the catalysts of some of the prior art and it is generally unnecessary to employ a solvent in order to produce a satisfactory sealant composition. If, however, the presence of a solvent is desired, then any solvent which dissolves both the diazosulfone and the ortho-sulfobenzimide and is itself soluble in the monomer may be employed. Common solvents are described in the literature and include, for example, alkanols such as methanol, ethanol, butanol and substituted and unsubstituted formamides such as formamide and N,N-dimethyl formamide.

In preparing these anaerobic curing compositions, it is within the scope of the present invention that the required acrylic monomer may be a mixture of acrylic monomers rather than a single acrylic monomer, and there may also be utilized, in combination therewith, other non-acrylic, ethylenically unsaturated copolymerizable comonomers such as unsaturated hydrocarbons, unsaturated esters and ethers, vinyl esters, and the like. Typical optional comonomers include: vinyl acetate, methyl vinyl ether, methyl vinyl ketone, poly(ethylene maleate), allyl alcohol, allyl acetate, 1-octene, styrene, etc.

In certain applications, and largely dependent on the particular acrylic monomer being utilized, such non-acrylic, polymerizable comonomer(s) may be added to constitute up to about 60%, by weight, of the monomer composition. Preferably, however, the optional non-acrylic comonomer will constitute no more than 50%, by weight, of the monomer composition, and most preferably, it will constitute no more than 30%, by weight, of the monomer composition.

Optionally, the compositions may also contain a minor amount, up to 50%, by weight, of a polymeric thickener, for example, a low or high molecular weight polymer or prepolymer. Illustrative of such polymeric thickeners is a commercially available methacrylate polymer sold by E. I. DuPont de Nemours and Company, under the trademark ELVACITE.

In order to further modify the properties of these compositions, they may optionally contain plasticizers such, for example, as dibutyl phthalate or triethylene glycol. Other optional ingredients include, inorganic thickeners, organic and inorganic fillers, cut glass fibers, as well as visible dyes or ultraviolet fluorescent dyes.

In order to prepare the anaerobic curing compositions of the present invention, it is merely necessary to mix the desired amount of catalyst with the selected acrylic monomer or monomers which may optionally contain non-acrylic copolymerizable monomer. Optional ingredients can be premixed into the monomer or alternatively admixed into the prepared composition.

The curing or polymerization of these compositions is initiated by the absence of air or oxygen and the contact of the adhesive with selected metal surfaces. The metals effective with the compositions described herein include iron, copper, tin, aluminum and silver and alloys thereof. Cadmium, chromium, nickel and zinc chromate platings have also been found to be useful in connection with the present compositions. The surfaces provided by the metals, alloys, and metallic platings which are useful in initiating the cure of these compositions will, for convenience, be grouped into the term "active metal" surfaces and be understood to include but not be limited to all of the metallic entities mentioned above.

It is to be further noted that in bonding components which do not comprise these active metals (e.g. plastic, glass, non-active metal surfaces) it is possible to effect curing by pretreating these surfaces with an active metal compound which is soluble in the monomer-catalyst mixture such as ferric chloride, and cobalt, manganese, lead, copper and iron "soaps" such as cobalt-2-ethyl hexoate, cobalt-2-ethyl butyrate, cobalt naphthenate, cobalt laurate, manganese- 2-ethyl hexoate, manganese-2-ethyl butyrate, manganese naphthenate, manganese laurate, lead-2-ethyl hexoate, lead-2-ethyl butyrate, lead naphthenate, lead laurate, etc. and mixtures thereof. These active metal compounds may be readily applied to the surfaces, for example, by wetting the surfaces with a dilute solution of the metal compound in a volatile solvent such as trichloroethylene and then permitting the solvent to evaporate. Non-active surfaces treated in this manner can be bonded together with the sealants of the present invention as quickly as active metal surfaces. As used herein, the term active metal will designate any metal, alloy or metallic plating capable of initiating the polymerization of my compositions on contact therewith in the absence of air or oxygen.

In order to maintain or increase the bond strength of the resultant cured polymer, one may utilize an acrylic monomer having an alcoholic or other relatively polar group substituted thereon. Examples of such polar groups in addition to the hydroxy group include, amino, amido, cyano, carboxy, mercapto, and halogen polar groups. Hydroxy group containing monomers are preferred. Ester having a labile hydrogen atom or atoms are also desirable. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

The compositions of this invention cure (i.e. polymerize or set) at ambient temperatures but heat may be used to accelerate the rate of curing. Compositions containing significant amounts of hydroxy substituted acrylic monomer are further crosslinked by the application of heat resulting in increased bond strength.

The following examples will further describe and illustrate the practice of this invention but they are not intended to limit its scope. In these examples the compositions were prepared by mixing the indicated ingredients in amounts given as parts by weight unless otherwise specified.

Table I illustrates the diazosulfone compounds of the formula:

where X and Y have values as indicated. Table IA shows the various monomers used in conjunction with the catalysts of Table I in the examples.

TABLE I

| Catalyst designation in the Examples | Value of X | Value of Y |
|---|---|---|
| A | 4-diethylamino | —CH₃ (para) |
| B | 2-chloro | —CH₃ " |
| C | 2,5-dichloro | —CH₃ " |
| D | 2-methyl-4-chloro | —CH₃ " |
| E | 4-diethylamino | —H " |
| F | 2-nitro | —CH₃ (para) |
| G | 4-diethylamino | -2-3-phenylene |

TABLE IA

| Designation in the Examples | Monomer Employed |
|---|---|
| Monomer AA | Ethyleneglycol dimethacrylate |
| Monomer BB | Hydroxyethyl methacrylate |
| Monomer CC | Hydroxyethyl acrylate |
| Monomer DD | Triethyleneglycol dimethacrylate |
| Monomer EE | Poly(butylene maleate)dimethacrylate (M.W. 2000) |
| Monomer FF | Poly(propylene glycol)dimethacrylate (M.W. 1025) |
| Monomer GG | Reaction product of 2 moles hydroxyethyl acrylate and 1 mole toluene diisocyanate |
| Monomer HH | Tetraethyleneglycol dimethacrylate |
| Monomer II | Bis(methacryloxy-2-hydroxypropyl)ether of Bisphenol A |

EXAMPLES 1–31

These examples illustrate representative anaerobic curing compositions of this invention prepared with a variety of diazosulfone catalysts. In these examples, the diazosulfone catalyst was dissolved in the monomer and the indicated amount of ortho-sulfobenzimide added.

The compositions thus prepared were then evaluated in a "finger-tight" lock test known in the art. About two or three drops of each composition were placed on the exposed threads of separate ⅜–24 iron bolts (degreased) and immediately thereafter a nut (degreased) with mating threads was run onto the bolt so that the nut was directly in the thread area of the applied composition. Measurements were made at room temperature to achieve a finger-tight lock such that the nut could not be moved on the threads with fingers.

The separate components, amounts and evaluation results are given in Table II.

TABLE II

| Example | Monomer | Diazosulfone | | Saccharin | Minutes to "Finger-tight" |
|---|---|---|---|---|---|
| 1 | HH | A | 0.2% | 0.0% | No cure |
| 2 | HH | A | 0.1 | 0.1 | 40 |
| 3 | HH | A | 0.1 | 1.0 | 25 |
| 4 | HH | A | 0.1 | 0.5 | 25 |
| 5 | HH | A | 0.25 | 0.3 | 10 |
| 6 | HH | A | 0.2 | 0.2 | 10 |
| 7 | HH | A | 0.5 | 0.5 | 8 |
| 8 | DD | A | 0.25 | 0.3 | 10 |
| 9 | DD | A | 0.50 | 0.50 | 8 |
| 10 | DD | A | 1.0 | 0.25 | 8 |
| 11 | EE | A | 0.5 | 0.5 | 20 |
| 12 | FF | A | 0.5 | 0.5 | 15 |
| 13 | FF | A | 2.0 | 0.25 | 9 |
| 14 | GG | A | 0.5 | 0.5 | 30 |
| 15 | II | A | 0.5 | 0.5 | 12 |
| 16 | AA | B | 0.25 | 0.5 | 35 |
| 17 | FF | B | 0.5 | 0.5 | 19 |
| 18 | HH | B | 0.25 | 0.5 | 35 |
| 19 | HH | B | 0.5 | 0.5 | 19 |
| 20 | HH | C | 0.25 | 0.5 | 50 |
| 21 | BB | C | 0.25 | 0.5 | 15 |
| 22 | CC | C | 0.25 | 0.5 | 5 |
| 23 | HH | D | 0.1 | 0.5 | Several hours |
| 24 | HH | D | 0.5 | 0.5 | 90 |
| 25 | HH | D | 0.75 | 0.5 | 17 |
| 26 | HH | D | 0.75 | 0.75 | 20 |
| 27 | HH | E | 0.25 | 0.25 | 8 |
| 28 | HH | E | 0.5 | 0.5 | 6 |
| 29 | AA | E | 0.5 | 0.5 | 15 |
| 30 | HH | F | 0.5 | 0.5 | Several hours |
| 31 | AA | G | 0.5 | 0.5 | 22 |

EXAMPLE 32

In order to show the necessity for the addition of the saccharin together with the diazosulfone as the catalytic components herein, the following experiment was performed.

Two compositions were prepared and tested as described in Examples 1–31 using the hydroxyethyl methacrylate (Monomer BB) and 0.5% of the catalyst designated A in the previous examples. In one composition, 0.5% saccharin was also added to the composition. In addition to testing to obtain finger-tight times, these two compositions were also tested and compared with respect to the bond strengths of the bond between the nut and bolt formed with the composition after curing at room temperature for overnight. The "torque" measurements shown in Table III indicate the amount of torque required for a wrench to remove the nut on the threads initially (break), for one-fourth turn, one-half turn, three-fourth turn and a full turn.

TABLE III

| Additive | "Finger-tight" | "Torque" | | | | |
|---|---|---|---|---|---|---|
| | | Break | ¼ Turn | ½ Turn | ¾ Turn | Full |
| None | >3 hours | 75 | 100 | 150 | 175 | 175 |
| Saccharin | 19 mins. | 175 | 200 | 200 | 225 | 200 |

As will be recognized by those skilled in the art, the present invention provides anaerobic curing compositions useful as adhesives and sealants which can be prepared in various formulations to provide a range of bond strength, polymerization rates, viscosities and shelf stability. Variations may be made in ingredients, proportions and procedures as long as such variations are within the scope and spirit of the following claims.

I claim:

1. An anaerobic curing composition stable when exposed to air comprising a mixture of a polymerizable acrylic or substituted acrylic monomer selected from the group consisting of (a)
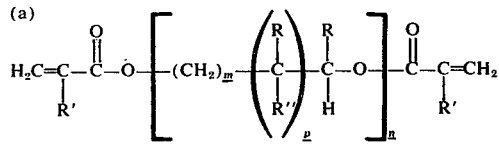

wherein
R is selected from the group consisting of hydrogen, methyl, ethyl,

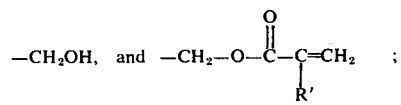

R' is selected from the group consisting of hydrogen, chlorine, methyl and ethyl;
R'' is selected from the group consisting of hydrogen, hydroxy,

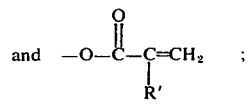

$m$ is an integer from 1 to 8; and
$n$ is an integer from 1 to 20; and
$p$ is 0 or 1;

(b)
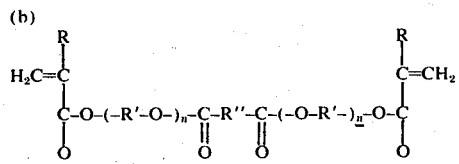

wherein
R represents hydrogen, chlorine, methyl or ethyl,
R' represents alkylene with 2–6 carbon atoms,
R'' represents $(CH_2)_m$ in which $m$ is an integer of from 0 to 8,

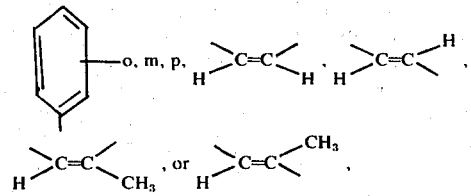

$n$ represents an integer of from 1 to 4;

(c)
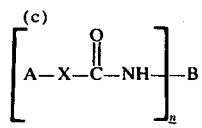

wherein
X is selected from the group consisting of —O— and

and
R is a member selected from the group consisting of hydrogen and lower alkyl of 1 to 7 carbon atoms,
A represents the organic residue of an active hydrogen containing acrylic ester wherein the active hydrogen has been removed, said ester being hydroxy or amino substituted on the alkyl portion thereof, and the methyl, ethyl and chlorine homologs thereof,
$n$ is an integer from 1 to 6, and
B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted;

(d)
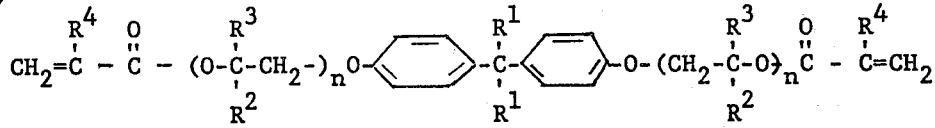

wherein
R¹ is selected from the group consisting of methyl, ethyl, carboxyl and hydrogen,
R² is selected from the group consisting of hydrogen, methyl and ethyl;
R³ is selected from the group consisting of hydrogen, methyl and hydroxyl;
R⁴ is selected from the group consisting of hydrogen, chlorine, methyl and ethyl and
$n$ represents an integer of from 0 to 8; and e. monofunctional acrylate and methacrylate esters and the hydroxy, amide, cyano, chloro, and silane substituted derivatives thereof; and from 0.05 to 4%, by weight of monomer, of a diazosulfone and from 0.05 to 4%, by weight of monomer, of ortho-sulfobenzimide, the latter compounds present in amount sufficient to initiate polymerization of said acrylic monomer at room temperature in the absence of air or oxygen and on contact with an active metal surface.

2. The composition of claim 1 wherein the diazosulfone corresponds to the formula:

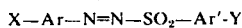

wherein
Ar and Ar' are aryl radicals and
X and Y are chosen from the group consisting of hydrogen, chlorine, fluorine, bromine, hydroxy, nitro, alkyl, alkoxy, aryloxy, alkyl substituted aryl, dialkylamino and carboxyalkyl.

3. The composition of claim 2 wherein
Ar and Ar' are phenyl,
X is 4-diethylamino and
Y is para-methyl.

4. The composition of claim 1 wherein the monomer is polymerizable hydroxyethyl acrylate.

5. The composition of claim 1 wherein the monomer is polymerizable hydroxypropyl methacrylate.

6. The composition of claim 1 wherein the monomer is the polymerizable reaction product of 2 moles to toluene diisocyanate, 1 mole of poly(propylene glycol) and 2 moles of hydroxyethyl acrylate.

7. A method of adhering closely facing surfaces, at least one being an active metal surface, which comprises interposing between said surfaces the composition of claim 1 and permitting said composition to cure in the absence of air or oxygen until said composition is set.

8. A method of adhering closely facing surfaces, at least one being an active metal surface, which comprises interposing between said surfaces the composition of claim 2 and permitting said composition to cure in the absence of air or oxygen until said composition is set.

* * * * *